March 2, 1937.  J. E. BALES  2,072,700
DISPLAY STAND
Filed March 18, 1935  2 Sheets-Sheet 2
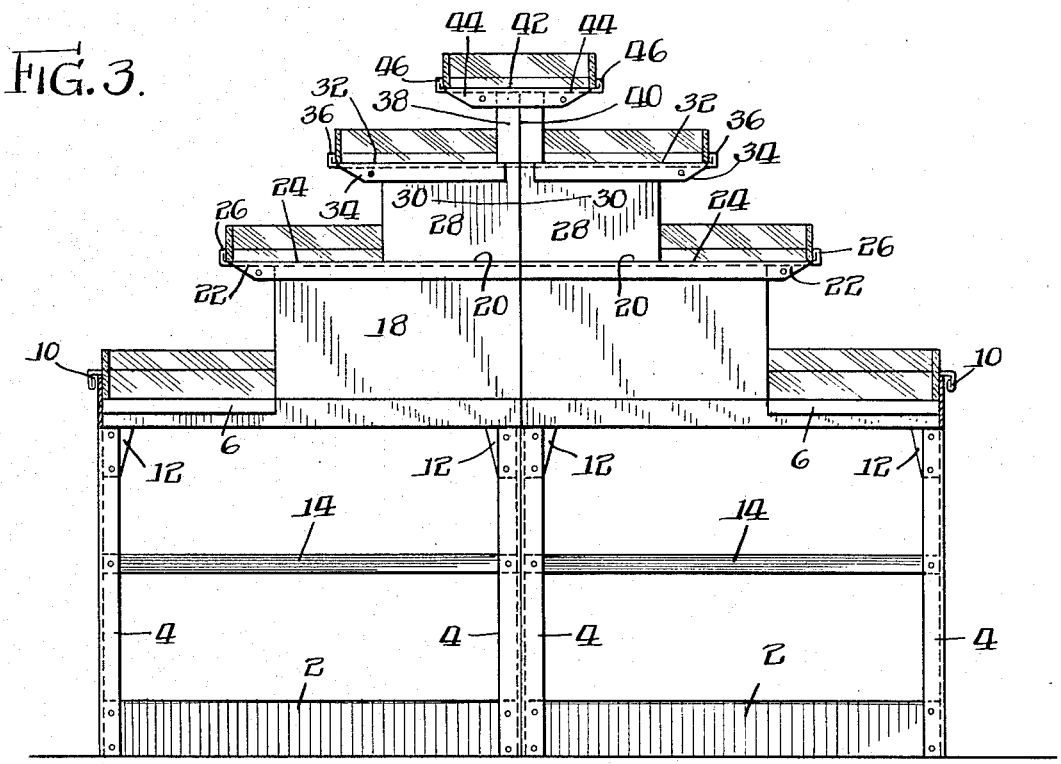
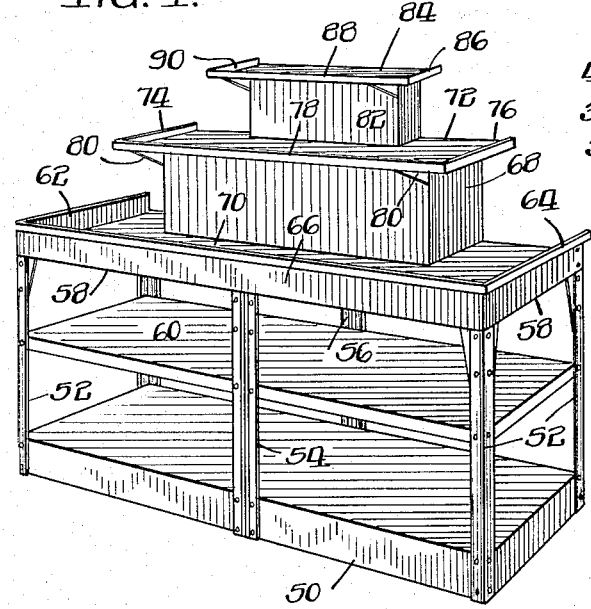
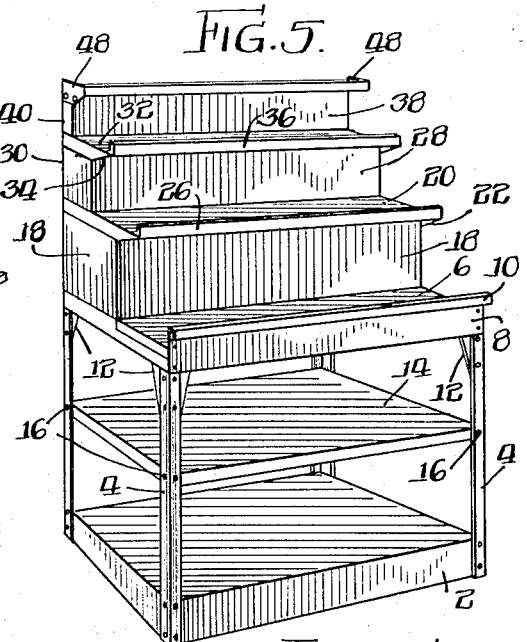
Inventor
James E. Bales
By: Cox + Moore attys Patented Mar. 2, 1937

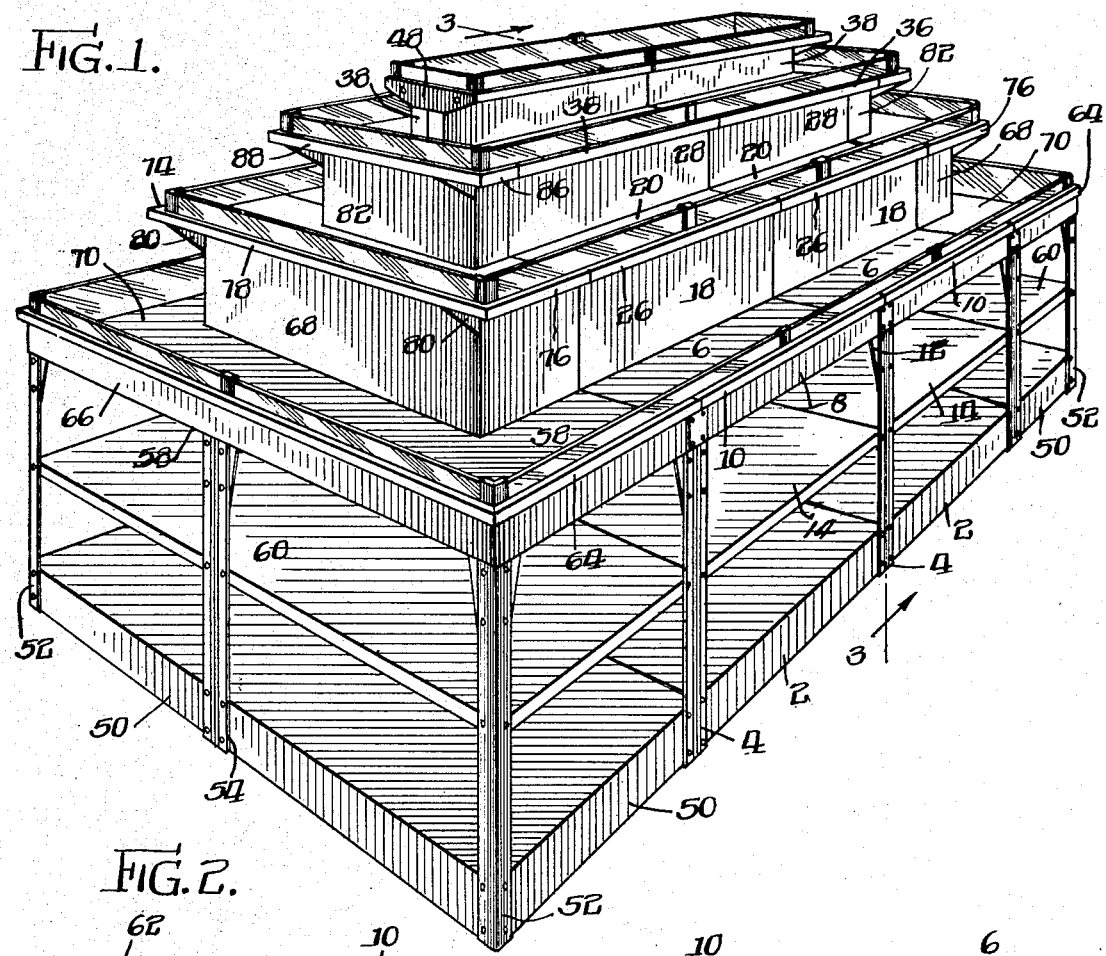

2,072,700

UNITED STATES PATENT OFFICE 2,072,700

DISPLAY STAND

James E. Bales, Aurora, Ill., assignor to Lyon Metal Products, Incorporated, Aurora, Ill., a corporation of Illinois Application March 18, 1935, Serial No. 11,572

5 Claims. (Cl. 211—128)

My invention relates to display stands or tables of stepped-top construction.

Among the objects of the invention is to provide a stepped-top display stand providing an unusual amount of square feet of top display area; to provide a display stand of stepped construction wherein the display shelf or platform of the stepped portion projects forward or overhangs the lower display level so that displayed goods can be visibly stored on the lower display level beneath the display overhang, whereby greatly increasing the loading and display capabilities of the stand; to provide a sectional display stand of stepped construction wherein the stand is formed of a plurality of sectional display units, each of stepped construction and which units are adapted to be assembled in various arrangements providing assembled sectional stands of varying display capacity and wherein each one of the sections is capable of separate and independent use as a display stand; to provide a sectional display stand of stepped construction wherein the amount of display space below the belt line of the purchaser is reduced and wherein the display space above the belt line of the purchaser is increased to provide greater visibility of the stepped display portion, including the top display portion; to provide a sectional display stand of stepped construction including two or more intermediate stepped sections adapted to be placed back-to-back in pairs in abutting relation and two end sections adapted to be backed to the sets of the pairs of intermediate sections to provide a complete display stand having stepped displays on all four sides; to provide a sectional stepped display stand of the foregoing character wherein certain of the upper stepped display sections may be removed to provide a sectional stepped stand having a relatively broad, flat display top; to provide a sectional stepped display stand wherein each display is provided with an upstanding border flange or rim of rugged construction adapted to be provided with posts to receive and hold an upstanding marginal glass flange and/or glass dividers or partitions; to provide a sectional display stand comprising assembled stepped sections of display stands arranged in abutting relation, back to back, in such a manner that the stand is provided with continuous stepped display stands on all four sides and in various elevations; to provide sectional display stands embodying broadly and/or specifically the features of construction set forth in the appended disclosure and in the accompanying drawings, wherein Fig. 1 is a perspective view of a merchandising counter or display stand showing the units assembled;

Fig. 2 is a plan view of the display stand showing relative positions of the two end units and the four intermediate units;

Fig. 3 is a section taken on line 3—3 of Fig. 1;

Fig. 4 is a perspective view of one of the two end units; and

Fig. 5 is a perspective view of one of the four intermediate units.

Referring now to the drawings in detail, with particular reference to Figs. 1, 4 and 5, the improved merchandising counter or display stand is formed of a plurality of sectional units comprising two end units of a general construction shown in Fig. 4, and one or more pairs of intermediate units of the general construction shown in Fig. 5. Fig. 1 shows two pairs of intermediate units disposed back to back with their inner sides of each pair abutting and with the end units abutting the outer sides of the two pairs of intermediate units to provide an assembled, closed island or complete stand of stepped construction, thereby providing continuous display surfaces or counters on all of the four sides of the stand, the continuous display counters being arranged in stepped arrangement, the topmost display stand forming a continuous flat top and all of the continuous display surface preferably being provided with upstanding marginal flanges or rims which are preferably provided with upstanding posts to receive and secure upstanding marginal glass partitions, and, if desired, transverse partitions.

In addition, the end unit shown in Fig. 4, and/or the intermediate single unit of a pair of intermediate units, as shown in Fig. 5, may be used alone as a display stand, preferably being abutted with its back against a wall.

In addition, each one of the intermediate display stands is adapted to have the two uppermost stepped portions thereof detached or removed for use as a two-high stepped display stand, and also the end unit is adapted to have its top step removed for use as a two-high display stand, and, in addition, with the removal of these top steps, as before described, the two or more pairs of intermediate units may be utilized with the two end sections in the manner shown in Fig. 1, to provide a completely assembled closed section of two-high stepped construction, and providing a flat topped, second deck or display stand of relatively large area or display dimensions.

The sectional construction of the stands permits them to be assembled in various arrangements, as hereinbefore described, by merely being placed in juxtaposition and without interconnecting fastening means and permits the detachable upper stepped portions, hereinbefore described, to be assembled or removed quickly, economically and expeditiously.

One of the principal and special features of the improved display stand, whether used as a completely assembled unit, as shown in Fig. 1, or as independent sectional units, as shown in Figs. 4, 5 and 6, is the fact that each stepped or upper display level is disposed in overhanging or projecting relation above the lower display stand, whereby to permit goods to be displayed in easily visible relation below the overhanging portion, whereby providing the maximum amount of display surface above the belt line of the purchaser, and whereby providing easily accessible display stands or display counters within easy access of the purchaser and thereby augmenting the display characteristics of the stand and increasing the opportunities for salability of the goods displayed.

Referring now to the drawings in detail, one unit of each pair of the intermediate units or stands comprises a sheet metal base 2 of preferably rectangular construction, to the corners of which are riveted, welded or otherwise fastened the upstanding corner posts 4 of angle iron construction. These corner posts are welded or riveted to the corners of a top 6, constituting the first display stand that is above, or substantially at the level of the belt line of a purchaser. This top 6 is preferably provided at its front edge with an upstanding marginal flange 8 having a curled edge 10. This upstanding flange 8 is of rugged steel construction, and it will be noted that it terminates at the ends of the top 6. The corner posts 4 are preferably provided with reinforced webbing 12 of any desired construction where they are connected to the top 6. In addition, the removable shelf 14 may be detachably fastened by means of any desired detachable members 16 to the corner posts, thereby providing, below the belt line of the ordinary purchaser, two storage stands, the one formed by the upper surface of the base 2, and the other formed by the removable shelf 14.

The top 6 is provided at its rear portion with an integrally attached, upstanding step 18 which terminates flush with the ends of the top 6. It will be noted that this step 18 covers the rear half of the top 6. This step 18 is provided with a top 20 which completely covers the entire area of the step 18 and, in addition, at the front, projects as at 22 in overhanging relation with respect to the display surface of the top 6, thereby providing a relatively broad display surface 24, for this second display level. The step 18 and top 20 are likewise formed of sheet metal, and preferably sheet steel, and at its forward edge the top 20 is provided with an upstanding flange 26 preferably provided with a curl. The step 18 and its top 20 are constructed in any desired manner, the top being rigidly connected to the step 18 by welding, riveting or otherwise. In addition, a removable, stepped attachment is provided for each one of these intermediate units, as shown in Fig. 5. This stepped attachment is two-high. It comprises a rectangular, elongated, box-like construction 28 adapted to rest upon the rear portion of the top 20, substantially the rear one-half area of the top 20, with its rear wall 30 flush with the rear wall of the intermediate unit. It is likewise formed of sheet metal construction in the manner hereinbefore described, and is provided with a top 32 forming an upper display surface, which likewise is provided with a projecting or overhanging display portion 34, which overhangs the display portion 24 of the unit. This overhanging portion 34 is likewise provided with an upstanding flange 36 provided with the curled edge. In addition, the rearmost portion of the top 32 is provided with a relatively narrow, upstanding, box-like construction 38 of sheet metal, the rear edge 40 of which is flush with the rear edge of the intermediate section. This box-like portion 38 is provided with a top 42 which likewise projects forwardly, as at 44, and overhangs the display surface 32 hereinbefore described, and this projecting portion 44 is likewise provided with an upstanding flange 46 having a curled edge. There is no upstanding flange for the rear longitudinal edge of this top supporting surface 44. The box-like structure 44, as hereinbefore described, is rigidly connected with the box-like portion 28 so that the attachment provides a detachable two-high stepped construction, which may be quickly placed in position on the hereinbefore described intermediate units to provide the assembled construction shown in Fig. 5.

By referring to Fig. 3, it will be seen that two of the intermediate sections, when placed back to back, provide a semi-circularly arranged pair of intermediate sections therein shown and wherein the top display stand is formed by the two abutting surfaces 40 arranged to provide a continuous and unbroken top display stand having upstanding flanges on all four sides, it being noted that the top or uppermost section is provided with side flanges 48 so that when the two intermediate sections are arranged back to back, the top display stand will be provided with a continuous upstanding rim to retain the articles on display.

Referring now to Fig. 4, showing one of the end sections or units, it will be seen that this comprises a base 50 which is constructed exactly like the base 2, except that it is in length twice the width of the base 2. This base 50 is provided with upstanding corner posts 52 of angle iron construction and in addition, intermediate upstanding side posts 54 and 56 which are welded or riveted to the base 50, and likewise to a top 58. In addition there may be provided a removable shelf 60 of the general construction and arrangement of shelf 14. The top 58 is provided with an upstanding border flange or rim 62, 64, at each end with a front flange 66. At the rear of the top there is no upstanding flange. However, to this top 58, intermediate its area, is provided a box-like step 68 which is spaced from the front flange 66 to provide a display surface 70 which is stepped from the upstanding end flange 64 to provide a display surface, and which is spaced from the end display flange 62 likewise to provide a horizontal display surface between the flange 62 and the box-like step 68. This box-like step 68 is likewise formed of sheet metal and is provided with a top 72 forming an upper display tray or surface, which at its two ends and front, is provided with upstanding flanges 74, 76 and 78, and which at its rear is left without a flange. The box-like structure 68 is flush with the rear wall of the top 58 and the top 62 is likewise flush with the surface 58. If desired, strengthening webs 80 may be provided for supporting the display surface 72 from the box-like structure 68 at the corners thereof.

In addition to the foregoing construction of one of these end sections, there is provided a removable upper or top step for each one of these end constructions comprising a box-like construction 82 of smaller dimensions, but substantially like the box-like construction 68. It is adapted freely to rest upon the rearmost portion of the upper display stand 72 and is provided with a top 84 which projects forwardly to overhang the front portion of the display top 72 beneath the display surface 84. This top 84 is provided with upstanding flanges 86, 88 and 90 at the two ends and front, but is not provided with upstanding flange at the rear. The length of the top surface 84 is exactly equal to twice the depth of the complete supporting surface 32, plus twice the depth of the top step 28, so that when the end section is backed against a pair of intermediate sections, as shown in Fig. 3, the end section will provide a closed or matched end for one side of the opposed pair of intermediate sections, as shown in Fig. 3. This arrangement is shown clearly in Fig. 1. In a similar manner, a second end section, constructed exactly like the end section shown in Fig. 4, will be arranged to abut the other side of the pair of back to back intermediate sections shown in Fig. 3, or where two pairs of intermediate sections are arranged back to back and side to side, as shown in Fig. 1, the second end section may be disposed so as to abut and form an end for the side wall of the second pair of intermediate sections to provide a complete assembled island or sectional unit, including two pairs of intermediate sections and two end sections, providing a completely continuous first level on all four sides of the stand, a completely continuous second level on all four sides of the stand, a completely continuous third level on all four sides of the stand, and a continuous top stand of the construction and arrangement shown in Fig. 1.

It will also be noted that each stepped stand is provided with a completely continuous marginal flange to retain the articles on display and that the horizontal continuous display surfaces are formed by the steps substantially overhanging the display surfaces beneath, thereby providing a greatly enlarged display area for the stand, which greatly exceeds the over-all display surface of a simple table of equivalent top dimensions, and which greatly exceeds any stepped construction heretofore provided, and wherein a maximum display surface is provided which is arranged at and above the belt line of the purchaser and within his easy reach and view.

By referring to the end unit shown in Fig. 4, it will be noted that the end unit has approximately 25% more display space than a flat top table occupying the same floor area; that the center intermediate unit shown in Fig. 5 has substantially 40% more display space than a flat top table occupying the same floor area. It will also be noted that utilization of sectional end units alone, placing them in front of window bulkheads, provides a low display without blocking the light, and furthermore, the intermediate units or end unit can be placed against any wall for a low feature display.

It will also be noted that if the construction shown in Fig. 1 is utilized, the two upper steps of the intermediate units, and the single upper step of the end unit, may be removed to provide a continuous, large flat top display, while retaining all of advantages of the lower overhanging display ledge. The display stands or tables, herein shown and described, may be utilized for displaying and selling automotive commodities, hardware, may be used in drug stores, grocery stores, in department stores and in gift shops, and in any other field desired.

It is thought that the invention and numerous of its attendant advantages will be understood from the foregoing description, and it is obvious that numerous changes may be made in the form, construction and arrangement of the various parts without departing from the spirit or scope of my invention and without sacrificing any of its attendant advantages, the form herein described being merely for the purpose of illustrating the invention, and I do not desire to limit the invention in any way to the particular construction shown.

I claim:

1. A display stand comprising a rack portion forming a rectangular table, a rectangular shelf and support means to carry said shelf above said table, said support means comprising a central panel portion and a rearwardly extending flange at each end of the panel portion, said flanges terminating at the rear edge of the table and extending in planes parallel with respect to the opposed end edges thereof, said panel portion extending in a plane parallel with respect to and spaced from the front edge of the table, and said flanges each being spaced a like distance inwardly from an adjacent end edge of the table whereby the stand is adapted to be utilized as a unidirectional stand facing in one direction; as a unit in back to back relation with a rack portion of like construction to form a dual stand facing a plurality of directions and offering a continuous horizontal display surface and a continuous display shelf in stepped relation thereto; and as an end piece in combination with two or more rack portions of similar construction arranged in back to back relationship whereby to form an elongated display stand.

2. A display stand comprising a pair of identical rack portions adapted for arrangement in back to back relationship, each rack portion comprising means forming a rectangular table, a rectangular shelf and support means carrying said shelf above said table, said support means comprising a central panel portion and a rearwardly extending flange at each end of the panel portion, said flanges terminating at the rear edge of the table and extending each in a plane including an end edge of said table, said panel portion extending in a plane parallel with the front edge of the table and spaced rearwardly thereof, the rearwardly extending flanges of one rack portion abutting the corresponding flanges of the other when said rack portions are arranged in back to back relationship whereby the support means of the several rack portions co-operate to form a hollow shelf pedestal, additional rack portions abutting the ends of said identical rack portions at each end of the display portion, each additional rack portion comprising means forming a rectangular table element of length equal to the combined widths of the rectangular tables of said identical rack portions, a shelf portion equal in length to the combined widths of the shelves of said identical rack portions, and vertical support means spaced rearwardly of the front edge of the table and inwardly of the opposed side edges thereof for carrying said shelf portion above said table element, whereby to form a multi-unit display stand having a continuous horizontal display surface and a continuous horizontal display shelf in stepped relation thereto, of which the units are adapted to be used singly if so desired.

3. A multi-unit display stand comprising a plurality of intermediate sections and a plurality of end sections, each section comprising a display surface and one or more display shelves in stepped relation thereto, the end edges of the shelves and surfaces of the intermediate sections being in vertical alignment, and the end edges of the shelves and surfaces of the end sections being in stepped relation, whereby a display table having a continuous horizontal display surface and continuous display shelves in stepped relation thereto is provided.

4. A multi-unit display stand comprising a pair of intermediate sections arranged in back to back relation and one or more end sections equal in length to the combined width of the pair of intermediate sections, each intermediate section comprising a horizontal display surface, and display shelves arranged in transverse stepped relation to said surface, each end section comprising a horizontal display surface, and display shelves arrange in longitudinal and transverse stepped relation to said surface whereby a continuous horizontal display surface and continuous horizontal display shelves are formed upon juxtaposition of the intermediate and end sections.

5. The combination defined in claim 4, wherein the horizontal display surface and shelves of each intermediate section are provided with vertical flanges extending outwardly from the front edge and longitudinally of the sections, and wherein the horizontal display surfaces and shelves of each end section are provided with vertical flanges extending peripherally of the three sides of the said sections, whereby a continuous rim to retain the articles on display on each display surface and shelf is provided.

JAMES E. BALES.